H. C. SIEVERS.
METHOD OF AND DEVICE FOR HOLDING PHOTOGRAPHIC FILM SHEETS.
APPLICATION FILED FEB. 18, 1914.
1,139,079.  Patented May 11, 1915.
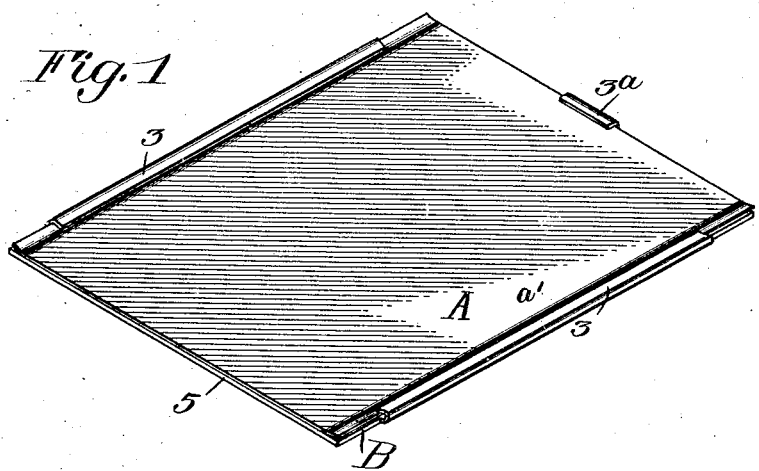
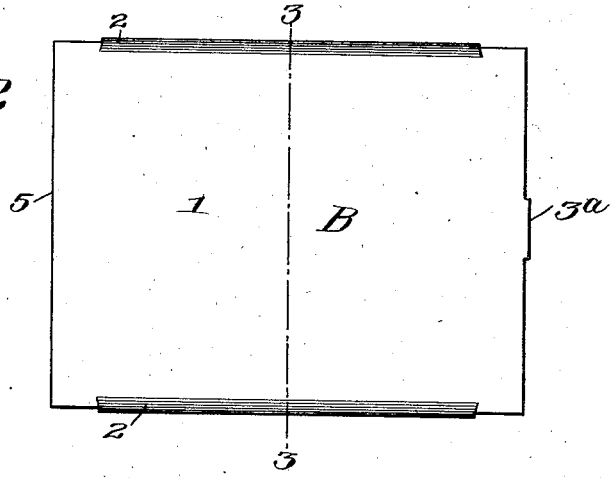
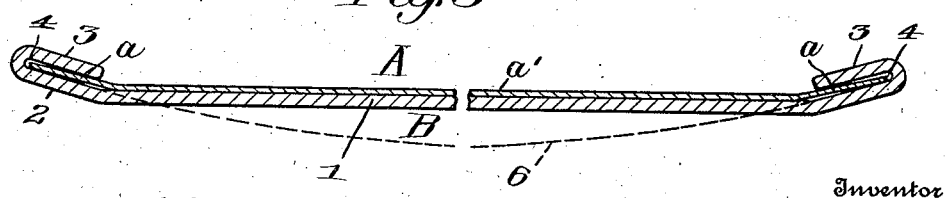
Witnesses
Nelson H. Copp
Russell B. Griffith
Inventor
Herman C. Sievers
By
his Attorneys

UNITED STATES PATENT OFFICE.

HERMAN C. SIEVERS, OF CHICAGO, ILLINOIS, ASSIGNOR TO EASTMAN KODAK COMPANY, OF ROCHESTER, NEW YORK, A CORPORATION OF NEW YORK.

METHOD OF AND DEVICE FOR HOLDING PHOTOGRAPHIC-FILM SHEETS.

1,139,079.      Specification of Letters Patent.      Patented May 11, 1915.

Application filed February 16, 1914. Serial No. 819,333.

*To all whom it may concern:*

Be it known that I, HERMAN C. SIEVERS, of Chicago, in the county of Cook and State of Illinois, have invented certain new and useful Improvements in Methods of and Devices for Holding Photographic - Film Sheets; and I do hereby declare the following to be a full, clear, and exact description of the same, reference being had to the accompanying drawings, forming a part of this specification, and to the reference-numerals marked thereon.

My present invention relates to photography and more particularly to the holding of flexible photographic film sheets known as "cut films" in the focal plane of a camera in position for exposure, and it has for its object to provide an improved method of and also a device for so holding the films wherein the sheets will be flattened out to a true plane and their tendency to buckle or bulge with a resulting lack of uniformity of focus throughout the extent thereof, defeated.

Further objects of the invention are directed toward promoting convenience in use and simplicity in operation and manufacture.

To these and other ends the invention consists in certain improvements and combinations of parts all as will be hereinafter more fully described, the novel features being pointed out in the claims at the end of the specification.

In the drawings: Figure 1 is a perspective view of a holder for photographic film sheets constructed in accordance with and illustrating one embodiment of my invention; Fig. 2 is a plan view of the back of the holder, and Fig. 3 is an enlarged section, broken away centrally, taken substantially on the line 3—3 of Fig. 2.

Similar reference numerals throughout the several figures indicate the same parts.

Flexible photographic film is exposed in the camera in two ways. The first way consists in spreading or stretching it in the focal plane while in a continuous strip or web that is intermittently fed across the field of exposure between a feed roll from which it is unwound in an unexposed state and a take up roll upon which it is wound after exposure. This constitutes what is known as a roll holding camera and as each successive area is halted in position behind the lens to receive the image cast thereby, opportunity is afforded for flattening it out, so that it will occupy a true plane and all portions of its sensitized surface will be equidistant from the lens and hence in focus, by virtue of the tension that may be placed upon it by having the winding roll exert itself against a slight unwinding resistance on the part of the feed roll. The second method which is adapted more particularly for the making of the larger size negatives consists in preparing cut sheets of film each of exactly the area of the desired exposure and inserting them, one at a time, in the focal plane of the camera by the employment of a suitable stiffening medium or holder just as plates are presented in a plate holder. The difficulty has heretofore been that the sheets, being inherently flexible and also subject to the buckling effects of atmospheric conditions and temperatures, are not disposed to remain flat or in a true plane where they will present focal uniformity, but have a tendency to warp and bulge. In the practice of my present invention, which relates to the last mentioned method, I correct these deficiencies by disposing the body of the sheet against a flat surface with which it contacts on its reverse side while opposite edges of the sheet are confined in angular positions with reference to said surface and to the intended plane of the sheet, namely, the focal plane of the camera. This angular disposition of the edges or holding parts imposes upon the sheet a tendency to assume a rearward curve or arc on the radius of the axis of the lens. But the presence of the backing prevents the formation of this curve while the efforts of the film sheet to assume it, owing to the stresses set up by the angularly confined edges, results in the body of the sheet flattening itself out against the backing and remaining in intimate contact therewith. A simple form of holding device for carrying out these effects is illustrated in the drawings.

Referring to the several figures, A indicates a sheet of cut flexible film and B an exposing holder. The latter is constituted by a metal plate, the body of which constitutes a flat backing 1. Opposite edge portions are inclined forwardly as at 2 and then doubled on themselves in parallel relationship at 3 to form inclined slots 4 of a width only slightly greater than the thickness of the film. The film sheet is preferably slipped in edgewise from the end indicated at 5 with its edges curled or bent angularly as at a to occupy the slots 4. A further small but flat flange 3ª is preferably provided at the opposite end of the holder to confine and limit the advancing end edge of the sheet. The body portion a' of the sheet thus thrusts itself against the body portion 1 of the backing or holder which it tightly hugs for the reasons first above set forth.

The natural curved position before mentioned that the sheet is always seeking to assume is indicated by the curved dotted line shown at 6 in Fig. 3.

I claim as my invention:

1. An exposing holder for photographic film sheets comprising a flat backing surface against which the body of the sheet is disposed and oppositely inclined elements forming slots adapted to confine opposite edges of the sheet and arranged forwardly of and angularly to the said backing surface.

2. An exposing holder for photographic film sheets comprising a flat backing plate having forwardly inclined doubled edges providing inclined slots adapted to receive opposite edges of the film sheet and to confine them in angular positions relatively to the backing plate.

3. The method of flattening photographic film sheets during exposure which consists in disposing the body of the sheet against a flat surface while opposite edges of the sheet are confined in forwardly inclined angular positions with reference to said surface.

4. An exposing holder for photographic film sheets, comprising a flat backing plate against which the body of the sheet is disposed and oppositely inclined surfaces at opposite edges of the plate having means for confining opposite edges of the sheet against the inclined surfaces, the latter being arranged forwardly of and angularly to the main surface of the backing plate.

HERMAN C. SIEVERS.

Witnesses:
B. R. HEFFNER,
RUBY E. TATE.